(12) United States Patent
Devitt

(10) Patent No.: US 8,427,021 B2
(45) Date of Patent: Apr. 23, 2013

(54) HYDROSTATIC BEARING MADE OF MAGNETIC MATERIAL WHICH IS ALSO USED AS A MOTOR MAGNET

(75) Inventor: Andrew J. Devitt, Media, PA (US)

(73) Assignee: Andrew J. Devitt, Media, PA (US)

( * ) Notice: Subject to any disclaimer, the term of this patent is extended or adjusted under 35 U.S.C. 154(b) by 192 days.

(21) Appl. No.: 12/700,542

(22) Filed: Feb. 4, 2010

(65) Prior Publication Data

US 2010/0277020 A1 Nov. 4, 2010

Related U.S. Application Data

(60) Provisional application No. 61/149,794, filed on Feb. 4, 2009.

(51) Int. Cl.
*H02K 5/16* (2006.01)
(52) U.S. Cl.
USPC ............................................................ 310/90
(58) Field of Classification Search ......... 310/156.01–156.84, 90, 179
See application file for complete search history.

(56) References Cited

U.S. PATENT DOCUMENTS

| | | | |
|---|---|---|---|
| 3,620,581 A | 11/1971 | Heller | |
| 5,036,235 A | 7/1991 | Kleckner | |
| 5,098,203 A | 3/1992 | Henderson | |
| 5,443,413 A | 8/1995 | Pflager et al. | |
| 5,488,771 A | 2/1996 | Devitt et al. | |
| 5,598,048 A * | 1/1997 | Dunfield et al. | 310/90.5 |
| 6,515,288 B1 | 2/2003 | Ryding et al. | |
| 6,657,343 B2 | 12/2003 | Ichiyama | |
| 6,961,213 B2 * | 11/2005 | Ameen et al. | 360/99.08 |
| 7,015,611 B2 * | 3/2006 | Tokunaga et al. | 310/90 |
| 7,232,257 B2 | 6/2007 | Sai | |
| 7,569,962 B2 * | 8/2009 | Ishikawa et al. | 310/162 |
| 7,798,721 B2 * | 9/2010 | Shibahara et al. | 384/107 |
| 7,990,013 B2 * | 8/2011 | Seo et al. | 310/216.002 |
| 2005/0140227 A1 * | 6/2005 | Kuwert | 310/90 |

* cited by examiner

Primary Examiner — Nguyen N Hanh
(74) Attorney, Agent, or Firm — Volpe and Koenig, P.C.

(57) ABSTRACT

A permanent magnet motor is provided with a housing, a rotating shaft supported within the housing, and magnetic coils arranged within the housing. A hydrostatic bearing is disposed on the rotating shaft, the hydrostatic bearing having a permanent magnet incorporated therewith that restricts movement of the rotating shaft in a radial direction.

16 Claims, 3 Drawing Sheets

HYDROSTATIC BEARING MADE OF MAGNETIC MATERIAL WHICH IS ALSO USED AS A MOTOR MAGNET

CROSS REFERENCE TO RELATED APPLICATION

This application claims the benefit of U.S. Provisional Patent Application No. 61/149,794, filed Feb. 4, 2009, which is incorporated by reference as if fully set forth.

FIELD OF INVENTION

This application is generally related to motors or generators having magnetic elements, and more particularly related to hydrostatic bearings constructed with a permanent magnet that can be used as the permanent magnetic element of motors or generators.

BACKGROUND

Some motors are designed to use coils in order to generate a magnetic field. These motors include two sets of coils, one located in the stator and one located in the rotor. One set of coils is energized using conductive contacts or brushes that may touch on the shaft or the moving body. The current fed to these coils creates an electromagnetic field. Other motors and generators employ permanent magnets to provide motion. Electricity is produced when coils of copper windings are moved relative to the flux fields generated by the magnets. Alternatively, electricity may be fed into the coils to produce motion. In both of these scenarios, separate bearings are used to define the relative motion between the coils and magnets, which may be linear or rotary in nature. In either case, the flux field creates an attractive force that must be resisted by the bearings. This force is mitigated in some degree when there is an opposing force applied at 180° from other magnets. Although the opposing force mitigates the flux field's attractive force, it is not a stabilizing force. For example, as the coils get closer to the magnets on one side, the attractive force from those magnets increase, which moves the coils further away from the magnets that are arranged at 180° and decreases the applied opposing force. In the absence of separate bearings, the coils and magnets would come into contact and disable the motor or generator's function.

Permanent magnet motors employ magnets made of, for example and without limitation, neodymium NdFeB or ferrite. There are multiple methods for manufacturing these magnets, such as through casting in a mold, pressing, injection molding, or bonding. In most cases, these magnets are porous, which is especially true for magnets that are sintered. These magnets may be magnetized after they have been formed into their desired shape. Motors and generators may employ a wide variety of magnetic circuit designs. Permanent magnets may be used on the outside diameter of a rotating body or on the interior of a housing. They may use switched reluctance or induction and may use AC or DC current.

Motors and generators' efficiency and power can be increased by minimizing the distance between the coils in the magnets. As the distance between the coils decreases, the flux field force increases. However, due to the unstable relationship between the coils and magnets as described above, relatively large gaps between coils must be used in the manufacture of motors and generators. Such an arrangement is shown by U.S. Pat. No. 5,036,235 to Klecker.

Design engineers have been trying to achieve more functionality in less space. The paradigm today in the design of motors and generators is to have separate bearings and motor functions. This results in assemblies that are longer, larger in diameter, and heavier than if the motor and bearing elements can be one in the same. For example, see the assembly shown by U.S. Pat. No. 5,443,413 to Pflager et al.

In U.S. Pat. No. 5,098,203 to Henderson, magnets are inserted into the face of a hydrostatic bearing assembly in order to increase the stiffness of the hydrostatic film with the magnets' preload force. However, there is no disclosure of using such magnets in a motor or generator.

One of ordinary skill in the art of hydrostatic bearings would appreciate that air and other gases are examples of a fluid used in hydrostatic bearings. This means that the broad term of hydrostatic bearings encompasses aerostatic bearings, as discussed in U.S. Pat. No. 5,488,771 to Devitt et al. The terms "hydrostatic bearings" and "hydrodynamic bearings" are both encompassed in the definition of "fluid film bearings." Hydrostatic bearings are differentiated from hydrodynamic bearings by the use of an external pressure source, which allows hydrostatic bearings to operate even with zero velocity between the relative bearing faces. In contrast, hydrodynamic bearings require relative motion between bearing faces to create fluid film pressure. One of ordinarily skill in the art would also appreciate that hydrostatic bearings exhibit hydrodynamic effects when there is relative motion between the bearing faces. These hydrodynamic effects are an unavoidable result of the shear of the hydrostatic fluid caused by the relative motion of the bearing surfaces, and are included in the operation of hydrostatic bearings.

Accordingly, it is an object of the present application to combine the bearing and motor functionalities, provide economy of space, and improve efficiency by reducing the gap in the flux field to the thickness of the hydrostatic bearing fluid.

SUMMARY

A permanent magnet motor is disclosed, the permanent magnet motor having a housing, a rotating shaft supported within the housing, and magnetic coils arranged within the housing. A hydrostatic bearing is disposed on the rotating shaft, the hydrostatic bearing having a permanent magnet incorporated therewith that restricts movement of the rotating shaft in a radial direction.

A method for making a permanent magnet motor is also disclosed. The method includes the steps of providing a housing with a rotating shaft supported therein, arranging magnetic coils within the housing, and disposing a hydrostatic bearing on the rotating shaft. The hydrostatic bearing has a permanent magnet incorporated therewith that restricts movement of the rotating shaft in a radial direction. For sake of brevity, this summary does not list all aspects of the present device, which is described in further detail below.

DETAILED DESCRIPTION OF THE PREFERRED EMBODIMENTS

Figure 1:
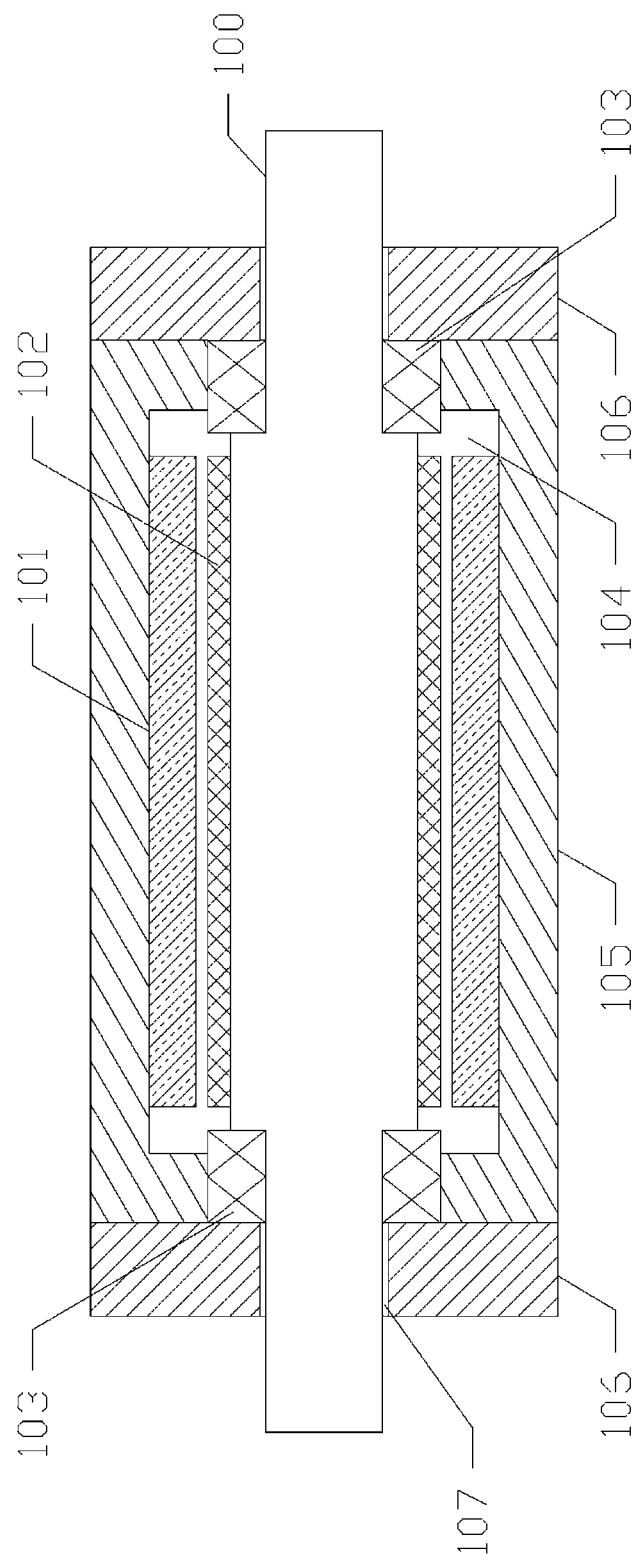
FIG. 1 is a cross-sectional view of a prior art motor having separate bearing and motor components.

Certain terminology is used in the following description for convenience only and is not limiting. The words "inner,"

"outer," "top," and "bottom" designate directions in the drawings to which reference is made. The terminology includes the words specifically noted above, derivatives thereof, and words of similar import.

FIG. 1 shows a prior art permanent magnet motor having a rotatable shaft 100 supported relative to a housing or stator 105 by a set of bearings 103 at each end of the rotatable shaft 100. The bearings 103 may be formed as plain, rolling, fluid film, or magnetic bearings, or any other form well known to those of ordinary skill in the art of bearings. In this case, the bearings 103 provide both radial and axial constraint. The bearings 103 provide radial constraint by having an outer diameter that corresponds to the inner diameter of the housing or stator 105, and provide axial constraint by being disposed between a shoulder 100a of the rotatable shaft 100 and a stationary retaining cap 106 of the housing or stator 105. Accordingly, the bearings 103 substantially constrains five degrees of freedom of the rotatable shaft 100, leaving only rotation unrestrained.

The prior art motor's motor elements are completely separate from the permanent magnets. Coils 101 are wrapped by 360° around the inner diameter of the housing or stator 105. Magnets 102 are disposed around the outer diameter of the rotatable shaft 100, leaving an air gap 104 between the magnets 102 and coils 101. The air gap 104 must be large enough to accommodate error motions in the bearings 103, out of balance centrifugal forces, and centrifugal force growth of the magnets 102 and rotor.

Figure 2:
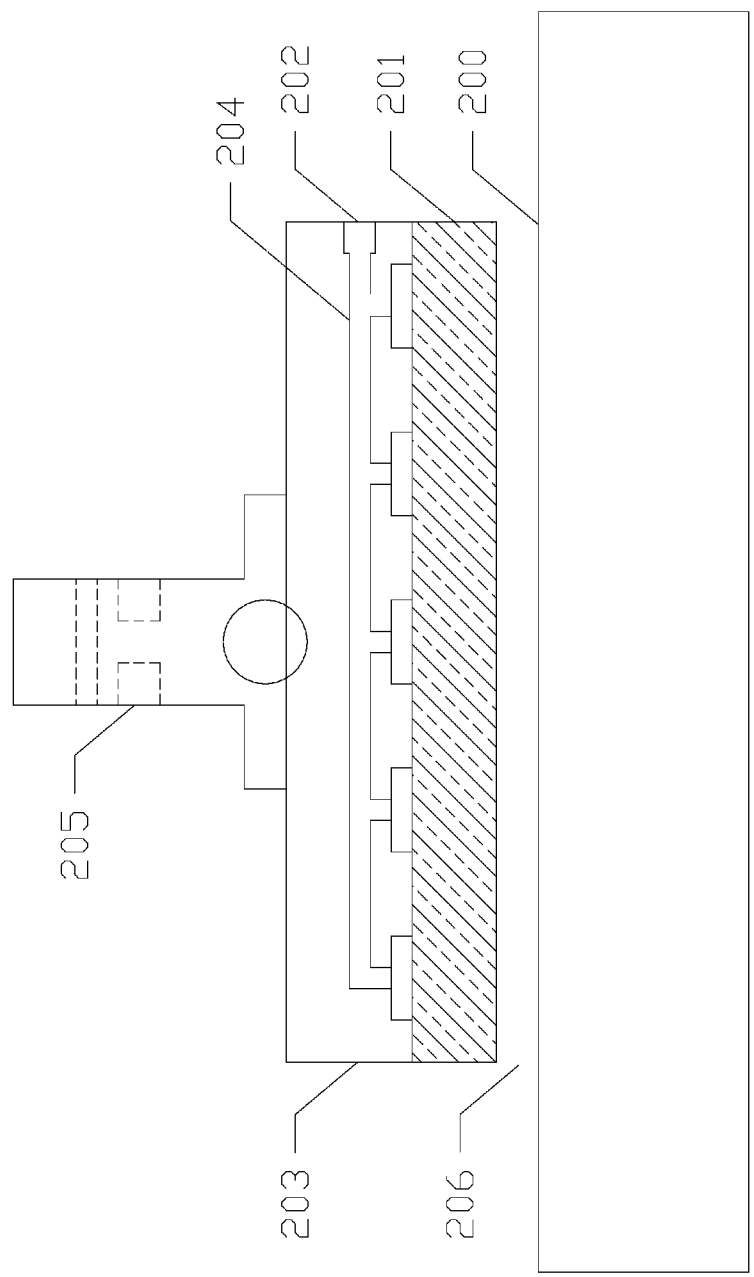
FIG. 2 is a cross-sectional view of an embodiment of the hydrostatic bearing of the current invention, which utilizes porous magnetic material as the restrictor for the hydrostatic bearing.

FIG. 2 shows an embodiment of a hydrostatic bearing according to the present invention. A magnetic material 200 that can be acted upon by an attractive magnetic field from a porous magnet 201 is separated from the porous magnet 201 by a pressurized hydrostatic film 206. The hydrostatic film pressure is maintained by a continuous flow of fluid, which is pumped through the porous magnet 201 by a pressure higher than ambient pressure. This pressurized fluid is introduced through input ports 202 and distributed across a back surface of the porous magnet 201 by a labyrinth 204. As shown in FIG. 2, the labyrinth 204 may be formed in a non-porous housing 203. In an alternative embodiment, which is not illustrated by the drawings, the labyrinth 204 may be formed in the porous magnet 201 itself. In a further alternative embodiment, also not illustrated by the drawings, the labyrinth may be formed in a separate modular bearing component that is mounted inside of the non-porous housing 203 or to a separate structure using a mounting stud 205, which may be attached through a flexure, gimbal mount, bolted joint, or bonded in place as disclosed in U.S. Pat. No. 5,488,771 to Devitt et al. In the above embodiments, the non-porous housing 203 and the porous magnet 201 are laminated together by any suitable means, such as through gluing, glazing, or grazing operations. These methods are well known in the art of manufacturing porous media hydrostatic bearings and have been described in U.S. Pat. No. 6,515,288 to Ryding et al. The pressurized fluid is also useful for removing heat from the bearing surfaces of the hydrostatic bearing and from the hydrostatic gap.

Figure 3:
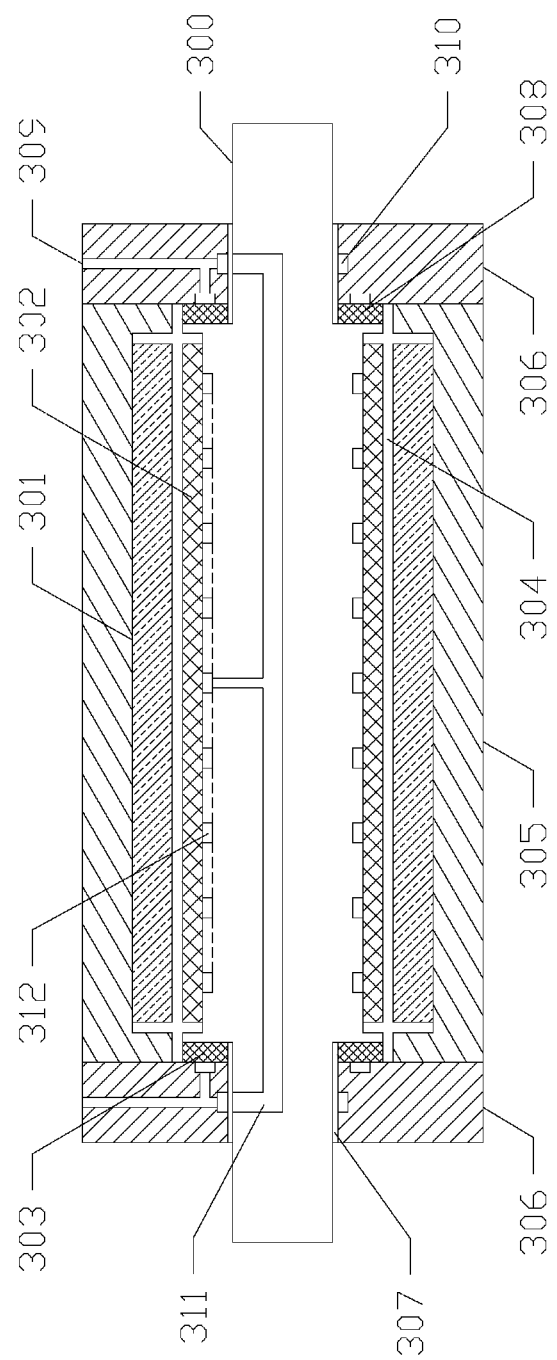
FIG. 3 is a cross-sectional view of another hydrostatic bearing that serves as the permanent magnet in a motor.

FIG. 3 shows a preferred embodiment of a hydrostatic bearing according to the present invention utilized in a permanent magnet motor. A rotating shaft 300 is provided with porous permanent magnet components 302 laminated onto the outer diameter of the rotating shaft 300. A labyrinth 312 is provided behind the porous magnet components 302 in a similar manner as described above with respect to FIG. 2. In order to supply the labyrinth 312 with a pressurized hydrostatic fluid, the fluid can be ported through a hole 309 in each retaining cap 306 on either side of the housing 305 and distributed through a groove 310 in the retaining caps' inner diameter that functions as a rotary union due to the small clearance 307 between the retaining caps 306 and rotating shaft 300, and finally into a hole 311 in the rotating shaft 300. This pressurized hydrostatic fluid then issues from the face of the porous magnet components 302, creating a pressurized film 304 that separates the porous magnet components 302 from the magnetic coils 301 despite the attraction between them. The attractive force between the porous magnet components 302 and magnetic coils 301 is used for the purposes of the motor or generator functionality, which is enhanced over the current art because the gap can be made smaller due to the safety afforded by the separation force of the pressurized fluid film 304 from the hydrostatic bearing functionality. This is because the flux field strength is very sensitive to the gap thickness. At very high pressures, this fluid film force may be used to counter the centrifugal force attempting to separate the porous magnet components 302 from the rotating shaft 300. While FIG. 3 shows the use of the porous magnet components 302 as the restrictive element in the hydrostatic bearing, other well known forms of restrictive compensation such as orifice or step compensation may be employed.

The embodiment of the hydrostatic bearing shown in FIG. 3 only provides radial restraint, so conventional rolling, plain, fluid film, or magnetic bearings may be used for axial restraint. Preferably, additional hydrostatic bearings 303 are used to provide axial restraint, and pressurized fluid from the same labyrinth 312 and fluid source is employed to create a hydrostatic bearing gap 308 on both ends of the rotating shaft 300, creating opposing forces and providing two-directional axial restraint. Although not shown in the drawings, the same bearing and motor/generator arrangement may be employed in both the axial and radial directions.

While various methods, configurations, and features of the present invention have been described above and shown in the drawings, one of ordinary skill in the art will appreciate from this disclosure that any combination of the above features can be used without departing from the scope of the present invention. It is also recognized by those skilled in the art that changes may be made to the above described methods and embodiments without departing from the broad inventive concept thereof. For example, the coils 301 shown in FIG. 3 may be located on the rotating shaft 300 while the porous magnet components 302 are located on the inner diameter of the housing 305, with electricity fed to the coils 301 via a conductive contact brush. Additionally, the embodiments of the invention are capable of being scaled up with coils and magnet diameters potentially reaching tens of meters.

What is claimed is:

1. A permanent magnet motor/generator comprising:
    a housing;
    a rotating shaft supported within the housing; and
    a hydrostatic bearing disposed on the rotating shaft and within the housing, the hydrostatic bearing comprising a first face that is a permanent magnet and a second face that is coils, the first face and the second face arranged such that movement of the rotating shaft is restricted in a radial direction, whereby the permanent magnet and the coils are configured to generate electricity or create force.

2. The permanent magnet motor of claim 1, wherein the permanent magnet is porous.

3. The permanent magnet motor of claim 2, wherein the first face and second face are separated by a hydrostatic gap.

4. The permanent magnet motor of claim 3, wherein the hydrostatic gap has a thickness of a pressurized film created by the pressurized fluid.

5. The permanent magnet motor of claim 3, wherein the pressurized fluid removes heat from bearing surfaces of the hydrostatic bearing and from the hydrostatic gap.

6. The permanent magnet motor of claim 3, wherein the pressurized fluid provides a force in a direction opposite to a centrifugal force, which attempts to separate the hydrostatic bearing from the rotating shaft during rotation at high speed.

7. The permanent magnet motor of claim 1 wherein the housing further comprises a third face and a fourth face that are permanent magnets, the third and fourth face arranged at opposite ends of the first face such that the movement of the rotating shaft is restricted in the axial direction.

8. A method for making a permanent magnet motor or generator, the method comprising:
providing a housing with a rotating shaft supported therein;
disposing a hydrostatic bearing on the rotating shaft and within the housing, the hydrostatic bearing comprising a first face that is a permanent magnet and a second face that is coils, the first face and the second face arranged such that movement of the rotating shaft is restricted in a radial direction, whereby the permanent magnet and the coils are configured to generate electricity or create force.

9. The method of claim 8, wherein the first face and the second face are separated by a hydrostatic gap.

10. The method of claim 9, where the thickness of the hydrostatic gap is equal to that of a pressurized hydrostatic film maintained by a continuous flow of fluid pumped through the permanent magnet.

11. The method of claim 8 wherein the housing further comprises a third face and a fourth face that are permanent magnets, the third and fourth face arranged at opposite ends of the first face such that the movement of the rotating shaft is restricted in the axial direction.

12. A permanent magnet motor or generator comprising:
a permanent magnet used as a restrictive element of a hydrostatic bearing;
coils, wherein the hydrostatic bearing works directly between the permanent magnet and the coils and the permanent magnet and coils are configured to generate electricity or create force.

13. A permanent magnet motor or generator according to claim 12, wherein the permanent magnet is porous and this porosity is used as the restrictive element and to issue fluid in the hydrostatic bearing.

14. A permanent magnet motor or generator according to claim 12, wherein a hydrostatic fluid is used as a mechanism to remove heat from the relative bearing surfaces and hydrostatic gap.

15. A permanent magnet motor or generator according to claim 12, wherein pressurized hydrostatic fluid force is used to resist the centrifugal force attempting to separate the bearing elements when there is rotation at high speeds.

16. A permanent magnet motor or generator according to claim 12 wherein the permanent magnet is used as a restrictive element in both the radial and axial directions.

* * * * *